United States Patent [19]

Guillemot

[11] Patent Number: 5,408,223

[45] Date of Patent: Apr. 18, 1995

[54] DEVICE FOR DETECTING TWO LEVELS OF A LIQUID HAVING HIGH AND LOW ELECTRODES OF METALS OF DIFFERENT ELECTRODE POTENTIALS WHICH ARE CONNECTED BY CONDUCTORS SO AS TO FORM AN ELECTRICAL PRIMARY CELL

[76] Inventor: Gilbert Guillemot, 7 rue de la Libération, 95650 Courcelles S/Viosne

[21] Appl. No.: 97,010

[22] Filed: Jul. 27, 1993

[30] Foreign Application Priority Data

Jul. 30, 1992 [FR] France .................. 92 09411

[51] Int. Cl.⁶ .................. G08B 21/00; G01F 23/00; H01M 10/48
[52] U.S. Cl. .................. 340/620; 73/304 R; 429/92; 340/618
[58] Field of Search .................. 340/612, 616, 618, 620; 73/304 R; 429/91, 92

[56] References Cited

U.S. PATENT DOCUMENTS

3,996,579 12/1976 Dahl .................. 429/92
5,216,288 6/1993 Greene .................. 340/620

FOREIGN PATENT DOCUMENTS

0478032 8/1991 European Pat. Off. ....... F25C 1/14
3442354 11/1984 Germany .................. G01F 23/24
4042257 12/1990 Germany .................. G01F 23/24

Primary Examiner—James J. Groody
Assistant Examiner—John W. Miller
Attorney, Agent, or Firm—Griffin, Butler Whisenhunt & Kurtossy

[57] ABSTRACT

A two-level detector for an electrically conductive liquid having a common electrode serving as a potential reference and situated at a low level, a high electrode situated at a high level, and a low electrode situated at the low level, the electrodes being connected by conductors to electronic apparatus for detecting the liquid at said two levels by means of currents flowing through the liquid. The high and low electrodes are made of metals that have different electrode potentials. A first conductor and a second conductor interconnect the electrodes to constitute an electrical primary cell that is short-circuited when both electrodes are simultaneously in contact with the liquid. The second conductor is extended to connect the electrode assembly to a signal terminal of the electronic apparatus. The common electrode is made of a metal whose electrode potential is different by about 0.4 volts from that taken by the first and second conductors of the equipotential link between the high and low electrodes when all three electrodes are in the liquid; the common electrode is connected to a common terminal of the electronic apparatus. The electronic apparatus constitutes a self-latching electronic relay which latches when a voltage above a voltage threshold of about 0.4 volts appears across the signal and common terminals because of the high electrode making contact with the liquid, and which automatically applies a voltage to said signal and common terminals that replaces the voltage from the high electrode when the liquid level drops.

5 Claims, 1 Drawing Sheet

FIG_1
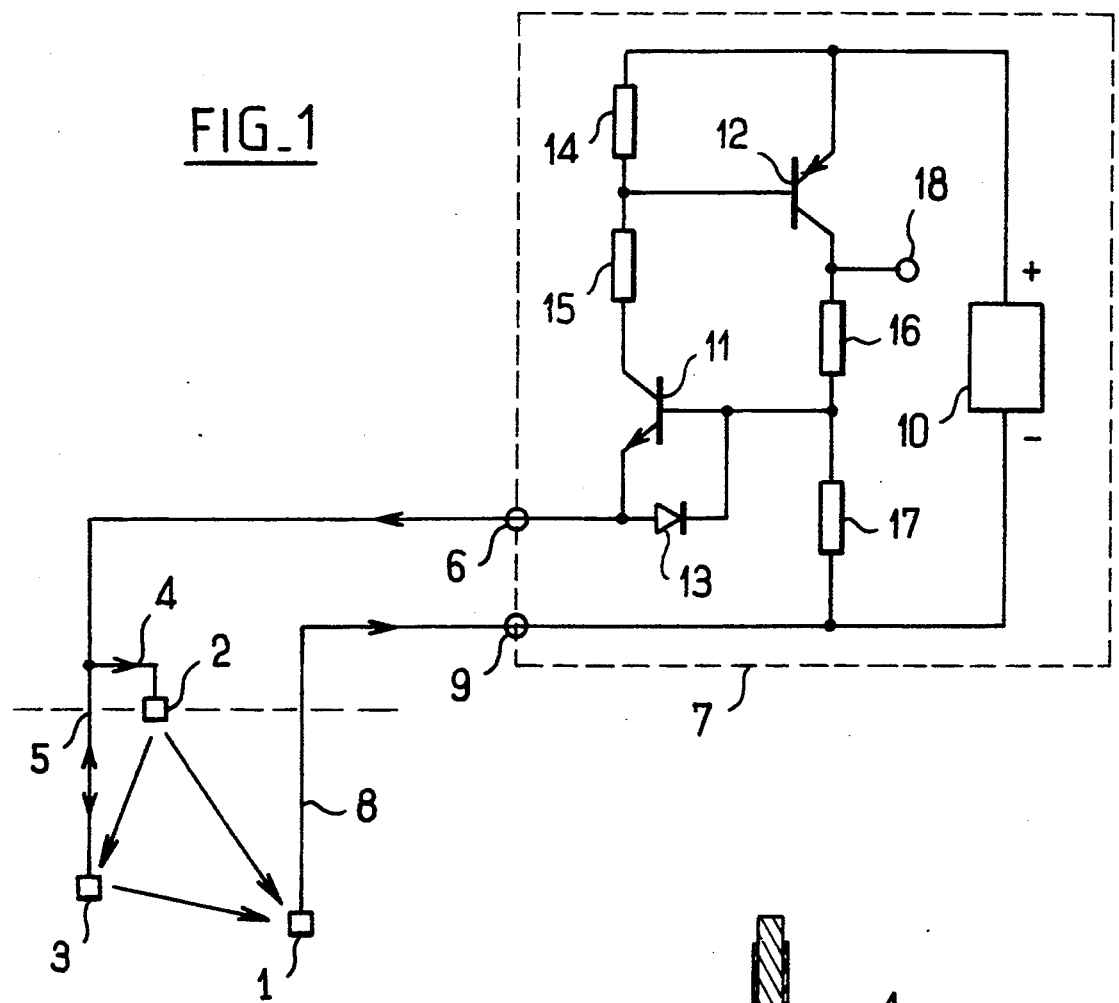
FIG_2
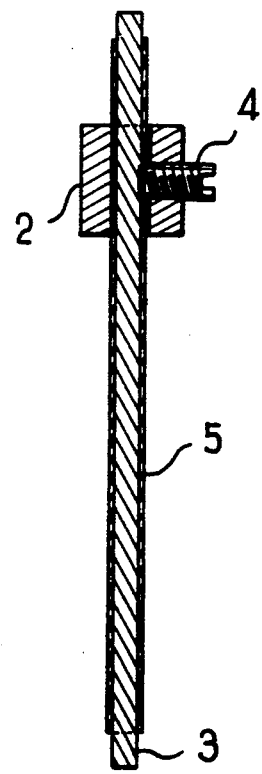

DEVICE FOR DETECTING TWO LEVELS OF A LIQUID HAVING HIGH AND LOW ELECTRODES OF METALS OF DIFFERENT ELECTRODE POTENTIALS WHICH ARE CONNECTED BY CONDUCTORS SO AS TO FORM AN ELECTRICAL PRIMARY CELL

The present invention relates to a device for detecting two levels of an electrically conductive liquid for the purpose of automatically controlling emptying and filling actions between said levels, the device making use of electrodes in contact with the liquid.

BACKGROUND OF THE INVENTION

Known devices based on the above principle possess three electrodes and three connection wires to the control system, with the control system often being protected from the liquid by a liquid-proof wall through which the wires pass. Often only two wires pass through the wall, if the wall itself is made of metal and serves as a reference potential common electrode, but two wires nevertheless remain necessary for connecting to the electrodes at high level and at low level. In addition to the problem of passing through the wall, there is also the difficulty of positioning the electrodes and of adjusting their heights in order to change one of the levels relative to the other.

OBJECT AND SUMMARY OF THE INVENTION

The device of the invention serves to simplify the above problems by using only one link wire for connection to both electrodes: the high level electrode and the low level electrode; the single wire serving to transmit corresponding signals to the control system. An essential characteristic of the device is that it includes electrodes made of different metals that therefore have different electrochemical potentials in contact with an aqueous solution, such that the electronic control system can recognize on a single wire whether the liquid is in contact with the high level electrode or the low level electrode.

To obtain a good understanding of this method of operation, it is recalled that according to Nernst's theory, a metal presents a characteristic electrode potential in an aqueous solution, which potential is more positive (relative to a hydrogen electrode) the better the metal resists oxidation, which is equivalent to the metal losing peripheral electrons in its atomic structure. This applies to noble metals such as copper, silver, and gold. At the other end of the electrode potential scale, a metal has a more negative potential if it oxidizes easily, as applies for example to zinc and magnesium. Zinc and magnesium are said to be more electropositive than copper, silver or gold since they lose electrons more easily in a chemical reaction. This is the phenomenon of the electrochemical couple that is used in an electric battery, and that is used in the present invention.

An advantageous feature of the device of the invention lies in selecting combinations of metals such that the potential differences transmitted to the control apparatus are taken into account as high or low level information only when they are greater than a threshold of about 0.4 volts in positive or negative polarity, in order to ensure that the apparatus remains insensitive to any parasitic potential variation due to electrode polarizing phenomena that take place while current is flowing through the liquid, which phenomena are highly variable as a function of the nature of the substances in solution, the areas of the electrodes, and the spacing between them. This choice of a threshold voltage of about 0.4V to about 0.5V corresponds naturally to the emitter/base voltage of a transistor used as a detector in the apparatus, below which voltage the transistor conducts practically no current.

BRIEF DESCRIPTION OF THE DRAWING

FIG. 1 is a circuit diagram of the device of the invention, showing the essential elements thereof: its three electrodes are shown in a vertical plane, with a horizontal dashed line passing through electrode 2 representing the level of the liquid, and with arrows indicating the direction of electrical current flow between the electrodes and in the conductors.

FIG. 2 shows a particularly simple embodiment of a set of two electrodes for the high level and for the low level.

MORE DETAILED DESCRIPTION

As can be seen in FIG. 1, the device includes a potential reference electrode 1 at low level connected by a conductor 8 to a terminal 9 of an electronic control apparatus 7. In conventional manner, the electrode 1 may be constituted by the metal vessel containing the liquid, or by any other conductive structure in contact with the liquid. The electrode 3 is also at a low level, either below or above the electrode 1, such that the first of the two of them to lose contact with a falling level of liquid interrupts the flow of current between them, thus constituting the low level signal. The metals used for these two electrodes are of the same kind, or they may be different, providing the difference between their electrode potentials is less than the design threshold. Since these electrodes are often in contact with water, they are preferably made of a noble metal such as copper or stainless steel, for example.

The electrode 2 situated at a high level is made of a metal that is very different from that of the electrode 1 form the point of view of electrode potential, i.e. the metal is highly oxidizable: zinc or magnesium. It is connected by a conductor 4 to the conductor 5 that connects the electrode 3 to the terminal 6 of the apparatus 7.

When all three electrodes are simultaneously in water up to the high level, three electric primary cells or "batteries" are established:

a battery between 2 and 3 whose current is short circuited by the conductors 4 and then 5, this equipotential link having a potential that lies between the electrode potentials of the two metals constituting these two electrodes, but that is preferably close to the electrode potential of electrode 2, which can be achieved by using an electrode 3 that is smaller in area than the electrode 2 and by insulating the conductor 5 from the liquid; and two other batteries firstly between electrodes 2 and 1 and secondly between electrodes 3 and 1, combining their currents collected by the electrode 1 whose total current enters the apparatus 7 via terminal 9 and returns via terminal 6 and the conductors 5 and 4 to the electrodes 3 and 2.

The apparatus 7 includes a DC electrical power supply 10, two transistors 11 and 12 of complementary NPN and PNP polarities, associated resistors 14 to 17, a diode 13 to protect the input of transistor 11, and an output terminal for transmitting signals to other, conventional control members (not shown).

FIG. 2 shows one embodiment of a set of two electrodes in which height is adjusted mechanically. The high level electrode 2 is a ring formed edgewise on a bar of magnesium which is pierced along its axis by a hole enabling it to slide along a rod. A stainless steel screw 4 screwed into a tapped hole in the ring constitutes the conductor 4 of the equipotential link mentioned above (FIG. 1). A brass rod or a stainless steel rod covered by a plastics sheath acts as the conductor 5, its top end being electrically connected to the terminal 6 of the apparatus 7 and its bared bottom end 3 acting as the low level electrode. Any location along the rod 5 may be selected for receiving the electrode 2 by baring the sheath at the point where the screw 4 clamps against the rod.

With reference to FIG. 1, the device of the invention operates as follows, starting from the liquid being at a low level where neither of the transistors 11 or 12 conducts. As the liquid level rises, it submerges the electrodes 1 and 3, but since they present no significant potential difference, the transistors remain OFF. When the liquid comes into contact with the electrode 2, the electrochemical cells are activated and the potential of the terminal 6 becomes more negative than the terminal 9 by a value that is greater than 0.5 volts, thereby causing the transistor 11 to conduct and in turn causing the transistor 12 to conduct with a feedback effect on the transistor 11 so as to form a kind of self-latching relay. When the liquid level falls and the electrode 2 comes out of the liquid, the primary cell effect disappears but the emitter current of transistor 11 continues to flow via the electrodes 3 and 1 so the apparatus 7 continues to operate until the liquid reaches its low level where the current through transistor 11 is interrupted by the liquid losing contact with the low electrode, so the apparatus 7 returns to its rest state.

The magnitudes of the currents flowing through the electrodes are very low, lying in the range about 1 microamp when the transistor 11 begins to conduct to about 80 microamps when it is saturated. As a result, electrolytic effects are negligible and in particular the magnesium of the electrode 2 dissolves very slowly: basing calculations on an electrode volume of 1 cubic centimeter and on the above-mentioned maximum current, the loss of volume would be one-half after 2.6 years, assuming that the apparatus is permanently in operation with its electrodes immersed.

The embodiment described above with reference to FIGS. 1 and 2 appears to be the most advantageous from the performance point of view, but the following variants may be mentioned as lying within the ambit of the invention:

the polarities of the electronic apparatus could be inverted by using a PNP type input transistor 11, and other semiconductor devices could be used to obtain a self-latching relay effect;

metals other than those mentioned could be used, providing they have characteristics that are equivalent from the electrode potential point of view;

the equipotential link 4 could be implemented by clamping the metal of the electrode 2 directly against the metal of the conductor 5, and it could even be implemented by electrolytic deposition in order to obtain perfect contact at the price of an electrode 2 that cannot be removed;

non-isolated areas may be left on the conductor 5, thereby constituting locations at which the electrode 2 can be fixed; and the conductor 5 may be implemented by a metal tube having an insulated conductor 8 passing therethrough for connecting the electrode 1 to the apparatus 7.

Industrial applications of the device of the invention are well known: all kinds of water level regulation, whether for filling a tank whose level tends to drop or for pumping water from a borehole while monitoring the reduced level obtained by pumping, or for pumping out seepage water from premises having no natural outflow.

Conventional apparatuses such as pumps, electrically controlled valves, etc. . . . may thus be actuated by the device of the invention with maximum accuracy and reliability.

I claim:

1. A device for detecting two levels of an electrically conductive liquid, the device being constituted by a common electrode serving as a potential reference and situated at a low level, a high electrode situated at a high level, and a low electrode situated at the low level, the electrodes being connected by conductors to electronic apparatus for detecting the liquid at said two levels by means of currents flowing through the liquid:

wherein:

the high and low electrodes are made of metals that have different electrode potentials;

a first conductor and a second conductor interconnect the electrodes to constitute an electrical primary cell that is short-circuited when both electrodes are simultaneously in contact with the liquid;

the second conductor is extended to connect the electrode assembly to a signal terminal of the electronic apparatus;

the common electrode is made of a metal whose electrode potential is different from that taken by the first and second conductors of the equipotential link between the high and low electrodes when all three electrodes are in the liquid, said potential difference differing by not less than about 0.4 volts;

the common electrode is connected to a common terminal of the electronic apparatus; and the electronic apparatus constitutes a self-latching electronic relay which latches when a voltage above a voltage threshold of about 0.4 volts appears across the signal and common terminals because of the high electrode making contact with the liquid, and which automatically applies a voltage to said signal and common terminals that replaces the voltage from the high electrode when the liquid level drops.

2. A device according to claim 1, wherein the first conductor is a metal fixing part between the high electrode and the second conductor.

3. A device according to claim 1, wherein the metal of the high electrode is directly connected against the metal of the second conductor, thereby eliminating the first conductor.

4. A device according to claim 1, wherein the second conductor is a rigid tube or rod along which the high electrode can be displaced and fixed.

5. A device according to claim 4, wherein the second conductor is covered by insulation over the major portion of its length, except for its bottom end which acts as the low electrode and for locations provided for fixing the high electrode.

* * * * *